United States Patent [19]

Glenn

[11] 4,079,205
[45] Mar. 14, 1978

[54] AUTOMATIC NUMBER IDENTIFICATION DEVICE

[75] Inventor: Frederick J. Glenn, Arlington Heights, Ill.

[73] Assignee: Cook Electric Company, Morton Grove, Ill.

[21] Appl. No.: 657,562

[22] Filed: Feb. 12, 1976

[51] Int. Cl.² .......................................... H04M 15/36
[52] U.S. Cl. .............................. 179/17 A; 179/18 FH
[58] Field of Search ........... 179/18 FH, 18 F, 18 FA, 179/17 A, 17 R

[56] References Cited

U.S. PATENT DOCUMENTS

| 3,005,052 | 10/1961 | Powers | 179/17 A |
| 3,019,297 | 1/1962 | Boswau | 179/17 A |
| 3,046,343 | 7/1962 | Cox | 179/17 A |
| 3,087,019 | 4/1963 | Faulkner | 179/18 FH |
| 3,278,687 | 10/1966 | Everett | 179/17 A |
| 3,410,961 | 11/1968 | Slawa | 179/18 FA |
| 3,579,254 | 5/1971 | Carmody et al. | 179/17 A |
| 3,855,420 | 12/1974 | Steidl | 179/18 FH |
| 4,001,512 | 1/1977 | Proctor et al. | 179/17 A |

Primary Examiner—Kathleen H. Claffy
Assistant Examiner—Gerald L. Brigance
Attorney, Agent, or Firm—Mason, Kolehmainen, Rathburn & Wyss

[57] ABSTRACT

An automatic number identification device is used in a telephone system to enable a telephone central office to identify from which of two parties on a two party telephone service a call is originating and is coupled to a pair of telephone lines extended from the telephone central office to one of the parties being served by the two party telephone service. A loop current sensor is connected in series relation with one line of the pair of the telephone lines forming a subscriber loop and detects when a specified loop current is present on the one line. When the loop current sensor detects such a loop current, a control circuit, energized by power derived from the telephone lines and coupled to the loop current sensor by a photo coupler, couples a resistive ground to both of the lines in the given subscriber's loop. The control circuit has an on-time delay so that ringing signals on the subscriber's lines do not effect the operation of the control circuit and an off-time delay so that dialing pulses are not distorted.

7 Claims, 1 Drawing Figure

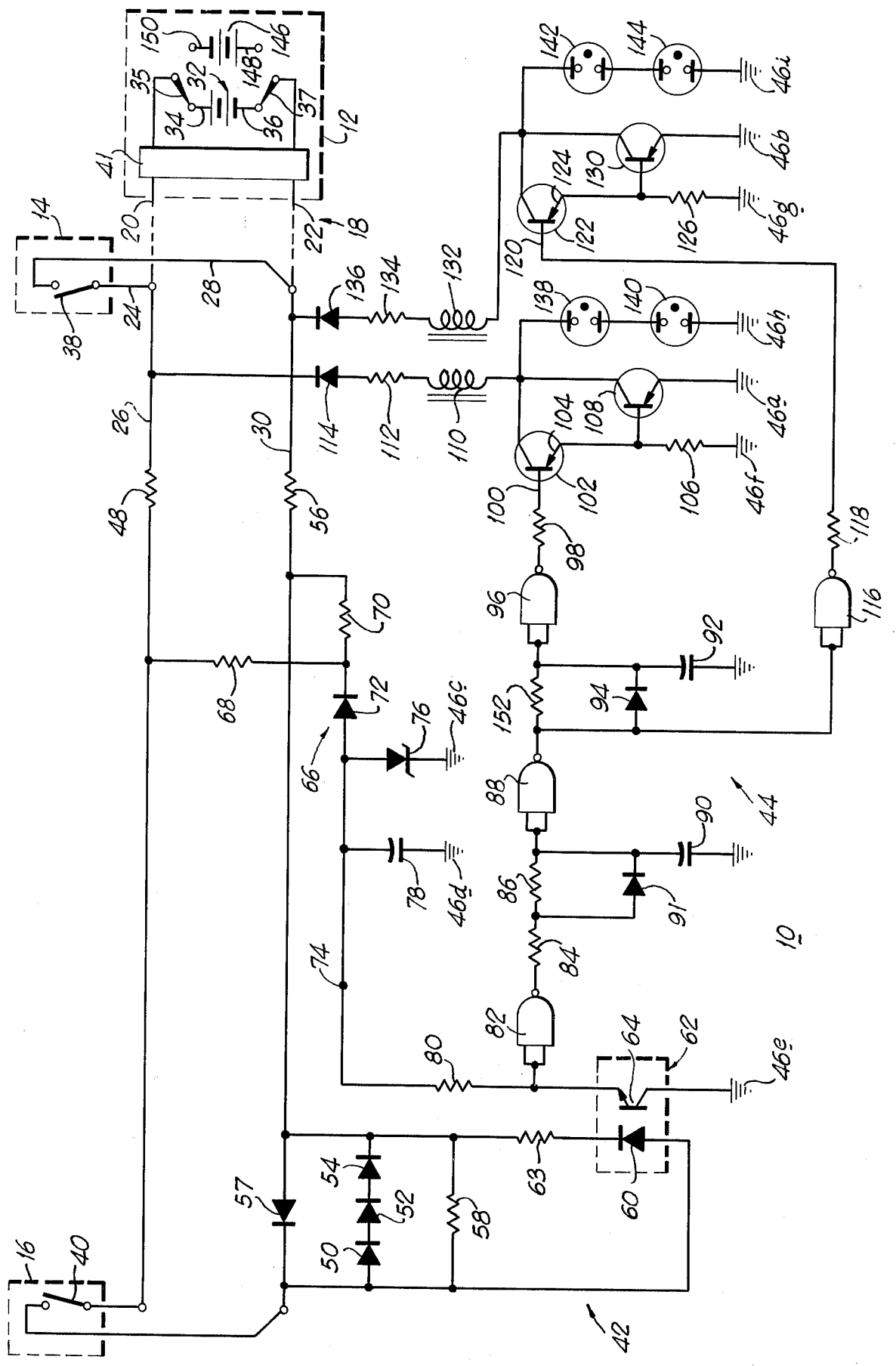

AUTOMATIC NUMBER IDENTIFICATION DEVICE

The present invention relates to telephone equipment used with telephone subscriber loops and more particularly, to a new and improved automatic number identification device for enabling identification of which of two parties on a two party telephone service originates a call.

In order to connect a telephone set or telephone sets at a remote location or station, such as a house or the like, to a telephone central office, two telephone lines, normally designated as tip and ring lines, are extended from the telephone central office to the given station. When a telephone set at the station is placed in an off-hook condition, namely, when the receiver is lifted by a subscriber using the telephone, loop current flows on the tip and ring lines between the telephone central office and the telephone set due to a central office battery coupled between the lines. The central office detects the flow of the loop current on the lines and in response to the loop current actuates various equipment so that the subscriber can complete his or her call. In a one party service, the central office can easily identify the subscriber because the tip and ring lines extend only to that given subscriber's telephone set and that information can be used in toll ticketing systems for billing purposes.

In some instances, a two party telephone service is provided for a given station or stations. In a two party telephone service, a single pair of lines, namely the tip and ring lines, is extended to the station. Two lines are then extended from these tip and ring lines to one party's telephone set or sets and another two lines are extended to the other party's telephone set or sets. When either of the parties places the telephone set in an off-hook condition, loop current flows in the tip and ring lines extended from the telephone central office. Although the central office can detect this loop current and actuate the appropriate equipment to enable the subscriber to place his or her call, the central office must also be able to identify which of the two parties on the two party telephone service is actuating the call so as to bill the call to the right party.

One method of so identifying the party originating the call is to connect a resistive ground (a resistor in series with a ground connection) to the tip line of one of the two parties whenever that party's telephone set is placed in an off-hook condition. Since the telephone central office normally has a grounded tip line and a relatively negative ring line, there will be more current flowing on the ring line at the telephone central office than the tip line when this resistive ground is placed on the particular subscriber's tip line. Equipment at the telephone central office can detect when this unbalanced current condition exists and can identify the call with the subscriber on the two party service who has the resistive ground connection.

However, the connection of the resistive ground to one of the party's telephone sets in a two party telephone service has certain disadvantages. One problem is that a resistive ground device must be installed in each telephone set of one of the two parties. Thus, if the party which is to be identified by the resistive ground has a number of telephone sets, a resistive ground device has to be placed in each of those sets. In addition, since the resistive ground is being placed on the tip side of the subscriber loop, it somewhat imbalances the impedance of the telephone loop. As a result, longitudinal voltages can cause detrimental line-to-line voltages on the subscriber loop.

Accordingly, objects of the present invention are to provide a new and improved automatic number identification device for identifying which of two parties on a two party telephone service is originating a call; to provide a new and improved automatic number identification device which can be mounted at a given station remote from the telephone set or sets at that location, such as at or in a station protector associated with the given party's telephone service; to provide a new and improved automatic number identification device which automatically connects a resistive ground to both the tip and ring lines of a subscriber loop so that the impedance of the line is not disturbed; to provide a new and improved automatic number identification device which does not distort dialing pulses on the telephone lines; and to provide a new and improved automatic number identification which is deactivated during the presence of conversation on the telephone lines.

In accordance with these and many other objects of the present invention, an embodiment of the present invention comprises an automatic number identification device for enabling a telephone central office to identify which of two parties on a two party telephone service is originating a call. The automatic number identification device includes a loop current sensor connected in series relation with one of a pair of telephone lines extended to the one of the parties being served by the two party telephone service. Upon the loop current sensor detecting a loop current present on that line, a control circuit which is energized by power derived from the telephone lines and which is coupled to the loop current sensor by a photo coupler couples a resistive ground to both of the lines in the given subscriber's loop. The control circuit has an on-time delay so that ringing signals on the subscriber's lines do not affect the operation of the control circuit and an off-time delay that does not effect or distort dialing pulses.

Many other objects and advantages of the present invention will become apparent from consideration of the following detailed description in conjunction with the drawing which discloses a schematic diagram of an automatic number identification device embodying the present invention.

Referring now more specifically to the drawing, therein is disclosed an automatic number identification device which is generally designated by the number 10 and which embodies the present invention. The automatic number identification device 10 is associated with a two party telephone service that is extended from a central office 12 to two subscribers 14 and 16. The central office 12 is coupled to the subscribers 14 and 16 by a pair of telephone lines 18 including a tip line 20 and a ring line 22. The tip line 20 is extended to the subscriber 14 by a tip line 24 and to the subscriber 16 by a tip line 26. The ring line 22 is coupled to the subscriber 14 by a ring line 28 and is coupled to the subscriber 16 by a ring line 30. Normally, the telephone central office 12 maintains a DC potential on the telephone lines 18, as is diagramatically shown by a battery 32 being coupled to the telephone lines 18 with a positive terminal 34 (which can be grounded) of the battery 32 coupled to the tip line 20 through a switch 35 and with a negative terminal 36 coupled to the ring line 22 by a switch 37.

When the subscriber 14 places any telephone set connected to the tip and ring lines 24 and 28 in an off-hook condition (i.e. when the subscriber 14 takes a receiver off one of the telephone sets) a hook switch, diagramatically shown as a normally open switch 38, is closed. Similarly, whenever the subscriber 16 places any of the telephone sets at its location in an off-hook condition, a hook switch, diagramatically shown as a switch 40, is closed. When either of the switches 38 or 40 is closed, a loop is formed via the pair of telephone lines 18 between the positive terminal 34 and the negative terminal 36 of the battery 32 so that a loop current flows along the telephone lines 18 from the relatively positive terminal 34 to the relatively negative terminal 36.

When such a loop current is flowing on the telephone lines 18, equipment 41 at the central office 12 coupled to the telephone lines 18 is capable of detecting the flow of that loop current so as to actuate other appropriate equipment to complete a call from the subscriber 14 or the subscriber 16. However, the telephone central office equipment 41 located at the telephone central office 12 does not know if the subscriber 14 has closed its hook switch 38 or the subscriber 16 has closed its hook switch 40. In order to have the telephone central office 12 identify which of the subscribers 14 or 16 is initiating the call, the automatic number identification device 10 is coupled to the tip line 26 and the ring line 30 associated with the subscriber 16.

When the hook switch 40 is closed by the subscriber 16, the loop current flowing on the tip and ring lines 26 and 30 is detected by a current detector or sensor 42 coupled to the ring line 30. Upon the sensing of the loop current by the current sensor 42, a control circuit 44 couples a ground terminal connection 46a to the tip line 26 and a ground terminal connection 46b to the ring line 30. The various connections of the automatic number identification device 10 to ground potential are designated by the number 46 with a different letter following the number. It should be understood that even though the various connections to ground potential are designated by different letters, they are all electrically at the same potential and all the ground terminals could have been designated as 46.

Since ground connections 46a and 46b are coupled to the tip and ring lines 26 and 30, respectively, more current will flow in the ring line 22 at the telephone central office 12 than the tip line 20. The equipment 41 at the telephone central office 12 can identify the imbalance in the loop currents on the telephone lines 18 and determine that the hook switch 40 has been closed rather than the hook switch 38. This is because when the hook switch 38 is closed, an equal amount of current will flow in both the tip and ring lines 24 and 28 as well as the tip and ring lines 20 and 22. Thus, whenever loop current flows in the tip and ring lines 26 and 30 due to the central office battery 32, the automatic number identification device 10 places a resistive ground on both the tip and ring lines 26 and 30 so that the telephone central office 12 can identify the fact that the subscriber 16 has initiated the call rather than the subscriber 14.

More specifically, whenever the subscriber 14 places its telephone set in an off-hook condition such that the switch 38 is closed, loop current flows from the positive or ground terminal 34 of the battery 32 through the tip lines 20 and 24, the closed switch 38, and the ring lines 28 and 22 to the negative terminal 36 of the battery 32. This loop current is detected by the equipment 41 in the central office 12. Since the loop current is equal on both the tip line 20 and the ring line 22, the central office 12 identifies the loop current with the subscriber 14 for billing purposes and the like.

On the other hand, when the subscriber 16 goes in an off-hook condition such that the switch 40 is closed, loop current once again flows from the positive or ground terminal 34 of the battery 32 through the tip lines 20 and 26, a resistor 48, the closed switch 40, three diodes 50, 52, and 54, a resistor 56, and the ring lines 30 and 22 to the negative terminal 36 of the battery 32. During this time, a diode 57 is reverse biased so that no current flows through it. Although the diodes 50, 52, and 54 are each forward biased and are therefore relatively conductive, there is a sufficient voltage drop across each of these diodes 50, 52, and 54 such that a potential difference is established across a resistor 58. The potential is such that a light emitting diode 60 forming a part of a photo coupler 62 is rendered conductive and current flows through the diode 60 and a resistor 63 enabling the diode 60 to emit light energy and causing a photo transistor 64, forming the other part of the photo coupler 62, to be rendered conductive.

Normally, the photo transistor 64 is maintained nonconductive by the potential supplied to it by a power supply generally indicated as 66. The power supply 66 derives its energy from the DC potential existing on the tip line 26 and the ring line 30 by means of a voltage divider consisting of a resistor 68 coupled to the tip line 26 and a resistor 70 coupled to the ring line 30. Since the common junction between the resistors 68 and 70 is at a relatively negative potential due to the DC potential on the telephone lines 18, a negative potential is supplied through a diode 72 to a terminal 74. This negative potential is regulated and filtered by a Zener diode 76 coupled between the terminal 74 and a ground connection 46c and by a capacitor 78 coupled between the terminal 74 and a ground connection 46d. The negative potential at the terminal 74 is supplied through a resistor 80 to the transistor 64 and inputs of a NAND gate 82.

As previously indicated, with the light emitting diode 60 rendered conductive and emitting light energy, the photo transistor 64 is rendered conductive such that a ground potential from the ground connection 46e is supplied to the inputs of the NAND gate 82. Since the inputs of the NAND gate 82 are shorted together, both of the inputs are placed at a relatively positive or ground potential. As a result, the output of the NAND gate 82 supplies a relatively negative potential through a resistor 84 and a resistor 86 to shorted input terminals of a NAND gate 88 and to a capacitor 90. The capacitor 90 will begin to charge since a diode 91 is reversed biased. When the capacitor 90 is sufficiently charged to placed a sufficiently negative potential on the shorted input terminals of the NAND gate 88, the output of the NAND gate 88 will become relatively positive in potential.

The resistor 86 and the diode 91 coupled in parallel act as an on-time delay for the control circuit 44 in order that the control circuit 44 is not affected by ringing signals. This is so because when the output of the NAND gate 82 becomes negative, the resistor 86 is in the charging circuit of the capacitor 90 and the capacitor 90 takes a specified time delay to charge. On the other hand, when the output of the NAND gate 82 reverts to its relatively positive or ground potential, the diode 91 becomes forward biased and the capacitor 90 can be quickly discharged through the diode 91. Since ringing signals tend to cause the output of the NAND gate 82 to fluctuate from negative to positive in accordance with the AC ringing potential, the capacitor 90 is quickly discharged through the diode 91 before it can be sufficiently charged through the resistor 86 to supply a sufficient negative potential to the input terminals of the NAND gate 88 to change its output to a relatively positive or ground potential.

When the output of the NAND gate 88 becomes relatively positive or grounded, a charged capacitor 92 will quickly discharge through a now forward biased diode 94 so that inputs of a NAND gate 96 will be placed at a relatively positive or ground potential. As a result, a relatively negative potential will be supplied from the output of the NAND gate 96 through a resistor 98 to a base electrode 100 of a transistor 102. The transistor 102 is rendered conductive since its emitter electrode 104 is coupled to a ground terminal 46f by a resistor 106. A transistor 108 also is rendered conductive enabling the ground terminal 46a to be coupled to the tip line 26 through the conductive transistor 108, an inductor 110, a resistor 112, and a diode 114.

When the output of the NAND gate 88 becomes relatively positive or grounded so that the capacitor 92 discharges, a relatively positive or ground potential is also supplied to the input terminals of a NAND gate 116. With the input terminals of the NAND gate 116 at a relatively positive or ground potential, the NAND gate 116 supplies a relatively negative output potential through a resistor 118 to a base electrode 120 of a transistor 122. Since an emitter electrode 124 of the transistor 122 is coupled to the ground or reference terminal 46g by a resistor 126, the transistor 122 is rendered conductive. As a result, a transistor 130 is also rendered conductive so that the reference terminal 46b is coupled to the ring line 30 through the conductive transistor 130, an inductor 132, a resistor 134 and a diode 136.

With the ground terminal 46a coupled to the tip line 26, a lesser amount of current flows along the tip line 20 from the positive terminal 34 of the battery 32 than would be the case if no such ground terminal 46a was coupled to the tip line 26. Likewise, since the ground terminal 46b is coupled to the ring line 30, a greater amount of current will flow along the ring line 22 toward the negative terminal 36 of the battery 32 than would be the case if no such ground terminal 46b was coupled to the ring line 30. This decrease in loop current on the tip line 20 and the increase of loop current on the ring line 22 causes an imbalance in the amount of current flowing on the tip line 20 and the ring line 22. This imbalance can be detected by the equipment 41 in the central office 12 so that the central office 12 can identify the fact that the subscriber 16, rather than the subscriber 14, is originating a call and this information can be used in toll ticketing systems for billing purposes or the like.

Even with the ground terminal 46a coupled to the tip line 26 and the ground terminal 46b coupled to the ring line 30, the impedances of the tip lines 20 and 26 and the ring lines 22 and 30 are still balanced because the same amount of impedance is coupled to the tip line 26 as is coupled to the ring line 30. Thus, the coupling of the reference terminal 46a to the tip line 26 and the coupling of the reference terminal 46b to the ring line 30 will not disturb the balance of the impedances of the telephone lines 18 so that longitudinal voltages or the like will not affect the operation of the telephone service to the subscribers 14 and 16.

In the event that high transient voltages, such as from lightning or the like, strikes the telephone lines 18, the transistors 102 and 108 are protected by the impedances in the diode 114, the resistor 112 and the inductor 110 as well as by neon lights 138 and 140 that will breakdown and discharge the potential to a ground terminal 46h. Likewise, the transistors 122 and 130 are protected from high transient voltages on the ring line 30 by the diode 136, the resistor 134 and the inductor 132 as well as by neon lights 142 and 144 that will be energized so as to dissipate the high transient voltages to a ground terminal 46i.

Advantageously, the inductors 110 and 132 also present a high impedance to longitudinal voltages occurring on the telephone lines 18. Thus, such longitudinal voltages will not affect the operation of the automatic number identification device 10 or affect telephone service along the telephone lines 18.

The automatic number identification device 10 will maintain the ground terminal connections 46a and 46b to the tip line 26 and the ring line 30, respectively, as long as the loop current is flowing in the telephone lines 18 in the direction from the positive terminal 34 to the negative terminal 36 of the battery 32. This is because the loop current will flow through the diodes 50, 52, and 54 so that the loop current sensor 42 activates the control circuit 44.

In the event the central office 12 changes the battery polarity on the telephone lines 18 when the hook switch 40 of the subscriber 16 is closed, such as during the time conversation is occurring on the lines 18 and as is diagramatically shown by the connection of another battery 146 to the telephone lines 18 through the switches 35 and 37, loop current will flow from a relatively positive terminal 148 of the battery 146 through the switch 37, the ring lines 22 and 30, the resistor 56, the diode 57, the closed hook switch 40, the resistor 48, and the tip lines 26 and 20 to a relatively negative terminal 150 of the battery 146.

Since the diodes 50, 52, and 54 are reversed biased, they are maintained nonconductive and no current flows through these diodes 50, 52, and 54. The minimum amount of voltage drop across the conductive diode 57 is not sufficient and is of the wrong polarity to place sufficient potential across the resistor 58 to cause a current to flow through the diode 60. With no current flowing through the diode 60, the diode 60 does not emit any light. Likewise, when no loop current is flowing on the telephone lines 18, such as when the hook switch 40 is open, no current will be flowing through the diodes 50, 52 and 54 and no current will flow through the diode 60 so that no light is emitted therefrom. Thus, as long as the current sensor 42 is not sensing any loop current on the tip line 26 and the ring line 30, or when that loop current is flowing through the diode 57 rather than the diodes 50, 52 and 54, the light emitting diode 60 does not supply any light to the base of the photo transistor 64.

In this condition, the photo transistor 64 is in its normally nonconductive state and a relatively negative potential from the power supply 66, and particularly, the terminal 74, is supplied through the resistor 80 to the input terminals of the NAND gate 82. The output of the NAND gate 82 reverts to its normal relatively positive or ground potential, and the diode 91 is forward biased. The capacitor 90 is discharged very quickly because the resistor 86 is effectively eliminated from the charging circuit of the capacitor 90. As a result, the inputs to the NAND gate 88 are placed at a relatively positive potential causing the output of the NAND gate 88 to be placed at a relatively negative potential. This relatively negative potential is coupled to the inputs of the NAND gate 116 and the output of the NAND gate 116 supplies a relatively positive or ground potential via the resistor 118 to the base 120 of the transistor 122. The transistor 122 as well as the transistor 130 revert to their relatively nonconductive state so that the ground reference terminal 46b is effective disconnected from the ring line 30. Thus, as soon as no loop current is detected on the tip and ring lines 26 and 30, or when a battery such as the battery 146 is placed across the telephone lines 18 by the central office 12, the ground terminal 46b is disconnected from the ring line 30.

When the output of the NAND gate 88 is switched to a relatively negative potential, the capacitor 92 slowly charges through a resistor 152 because the diode 94 is reversed biased so that current cannot flow through the diode 94. After a specified time delay or off time delay caused by the relatively slow charging of the capacitor 92 through the resistor 152, the input to the NAND gate 96 becomes relatively negative and the output of the NAND gate 96 becomes relatively positive or is placed at ground potential. This positive potential is supplied through the resistor 98 to the base 100 of the transistor 102. The transistor 102 and the transistor 108 become nonconductive such that the reference terminal 46a is disconnected from the tip line 26. As indicated, the charging of the capacitor 92 through the resistor 152 will delay the disconnection of the ground terminal 46a from the tip line 26 for a desired or predetermined amount of time determined by the values of the resistor 152 and the capacitor 92 to establish an off time delay.

This off time delay primarily is used to prevent the ground terminal 46a from being disconnected from the tip line 26 during dialing by the subscriber 16. During dialing, the subscriber 16 is in essence opening and closing momentarily the hook switch 40 so as to briefly interrupt the flow of loop current on the telephone lines 18. The current sensor 42 senses the lack of loop current on the line 18 and the control circuit 44 would disconnect the ground terminals 46a and 46b for the tip and ring lines 26 and 30, respectively, if it were not for the off time delay. However, since the tip lines 26 and 20 are connected to a grounded terminal 34 of the battery 32 during dialing, it is not necessary to disconnect the ground terminal 46a from the tip line 26. By selecting the off time delay to be greater than the amount of time the hook switch 40 is open during dialing, the ground reference terminal 46a will be maintained coupled to the tip line 26 even during the dialing sequence so that the central office 12 can readily identify the subscriber 16. On the other hand, it is necessary to disconnect the ground terminal 46b from the ring line 30 during dialing. This is done by supplying the relatively negative potential from the output of the NAND gate 88 to the input of the NAND gate 116 without any time delay such as the time delay provided by the resistor 152 and the capacitor 92. If the ground terminal 46b was not removed during this interruption of loop current during dialing, current would flow on the ring line 22 even when no loop current should be present because the ground terminal 46b would provide a path for current to the negative battery terminal 36. As a result, the dialing pulses could be distorted.

As indicated above, the power for the automatic number identification device 10 is provided for by the power supply 66 at the terminal 74. This power is supplied to all of the NAND gates 82, 88, 96 and 116 in the control circuit 44, as well as the transistor 64. Since the power supply 66 is completely dependent on the power it receives from the battery 34 via the tip lines 20 and 26 and the ring lines 22 and 30, the automatic number identification device 10 need not be energized by any external power supply and can be attached anywhere along the tip and ring lines 26 and 30 associated with the subscriber 16 such as at a station protector associated with the subscriber 16.

Although the present invention is described with reference to one illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A grounding device for coupling ground means to each of a pair of telephone lines, said grounding device comprising:
    a current sensor coupled in series relationship with one of the telephone lines so as to detect a specified current on said telephone line, and
    a control circuit associated with the current sensor and energized in response to the current sensor detecting said specified current, said control circuit having coupling means coupling said ground means to each of said telephone lines in response to said control circuit being energized and disconnecting said ground means from said telephone lines whenever said control circuit is not energized in response to said current sensor detecting said specified current, said control circuit having an off-time delay means to delay for a specified period of time the disconnection of said ground means from one of said telephone lines.

2. The grounding device as set forth in claim 1 including a power supply means coupled to and deriving power from said telephone lines, said power supply means supplying said control circuit with power.

3. The grounding device as set forth in claim 1 wherein said control circuit has an on-time delay means delaying the coupling means from coupling said ground means to said telephone lines for a specified period of time.

4. An automatic number identification device associated with a pair of telephone lines having a loop current impressed thereon by a telephone central office, said automatic number identification device comprising:
    a current sensor coupled to one of said telephone lines, said current sensor having a plurality of first unidirectional conduction means coupled in series relationship with one of said telephone lines to conduct a specified loop current flowing in a specified direction on said one of said telephone lines and a second unidirectional conduction means coupled across said plurality of first unidirectional conduction means to conduct loop current flowing in a direction opposite said specified direction on said one of said telephone lines,
    a photo coupler means coupled to said current sensor and having a light emitting means coupled to said plurality of first unidirectional conduction means such that said photo coupler means is energized when said plurality of first unidirectional conduction means conducts said specified loop current, and a control circuit coupled to said photo coupler means and being responsive to said photo coupler means, said control circuit having first connecting means to connect a ground means to one of said telephone lines and second connecting means to couple said ground means to said other of said telephone lines in response to said photo coupler means being energized.

5. The automatic number identification device as set forth in claim 4 wherein said photo coupler means includes a light emitting device which emits light energy in response to said current sensor detecting the specified loop current on said telephone line, and a light responsive means which is activated in response to said light emitting means emitting said light energy.

6. The automatic number identification device as set forth in claim 4 including resistive means and inductance means coupling said first and second connecting means to said telephone lines.

7. The automatic number identification device as set forth in claim 4 wherein said control circuit is responsive to said photo coupler means such that said first connecting means disconnects said ground means from one of said lines and second connecting means disconnects said ground means from the other of said telephone lines whenever said current sensor is not detecting said specified loop current, said control circuit further including an off-time delay means which delays said second connecting means from disconnecting said ground means from said other of said telephone lines for a specified time period after said current sensor no longer detects said specified loop current.

* * * * *